United States Patent
Hou et al.

(10) Patent No.: US 9,130,694 B2
(45) Date of Patent: Sep. 8, 2015

(54) METHOD, APPARATUS, AND SYSTEM FOR PHASE JUMP DETECTION

(71) Applicant: Huawei Technologies Co., Ltd., Shenzhen, Guangdong (CN)

(72) Inventors: Jianhui Hou, Chengdu (CN); Jun Chen, Chengdu (CN); Yuanjun Du, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/255,681

(22) Filed: Apr. 17, 2014

(65) Prior Publication Data

US 2014/0314133 A1    Oct. 23, 2014

(30) Foreign Application Priority Data

Apr. 22, 2013  (CN) .......................... 2013 1 0140521

(51) Int. Cl.
*H04L 7/04*    (2006.01)
*H04K 3/00*    (2006.01)

(52) U.S. Cl.
CPC .......................................... *H04K 3/20* (2013.01)

(58) Field of Classification Search
USPC ......... 375/224, 226, 316, 295, 346, 354, 376, 375/373, 375
See application file for complete search history.

(56) References Cited

U.S. PATENT DOCUMENTS

| | | | |
|---|---|---|---|
| 7,953,200 B2 * | 5/2011 | Ulrey | 375/376 |
| 2003/0179028 A1 * | 9/2003 | Kizer et al. | 327/158 |
| 2009/0252269 A1 * | 10/2009 | Gunturi et al. | 375/365 |

* cited by examiner

*Primary Examiner* — Siu Lee
(74) *Attorney, Agent, or Firm* — Leydig, Voit & Mayer, Ltd.

(57) ABSTRACT

The present invention provides a phase jump detection method, apparatus, and system. In embodiments of the present invention, by collecting N frequency control words, a phase jump in an intermediate frequency signal is detected according to the N frequency control words. An extra phase jump meter is not required, and therefore detection may be supported on massive microwave communication devices, thereby improving the detection efficiency.

16 Claims, 5 Drawing Sheets

METHOD, APPARATUS, AND SYSTEM FOR PHASE JUMP DETECTION

CROSS-REFERENCE TO RELATED INVENTION

This invention claims priority to Chinese Patent Invention No. 201310140521.2, filed on Apr. 22, 2013, which is hereby incorporated by reference in its entirety.

TECHNICAL FIELD

The present invention relates to communications technologies, and in particular, to a method, an apparatus, and a system for phase jump detection.

BACKGROUND

When a microwave communications device, that is, an outdoor unit (ODU) performs microwave communication, a carrier of a signal (a received signal or a transmitted signal) is generated by a local oscillator of a radio frequency module of the microwave communications device, and a frequency jitter, which is referred to as a phase jump, may be generated by the local oscillator when a stress change such as a temperature change and a pressure change. In the prior art, a phase jump meter may be used to detect a signal of the microwave communications device to acquire a frequency jump in the signal.

An extra phase jump meter, however, is required. Therefore, detection is not supported on massive microwave communications devices, and therefore the detection efficiency is reduced.

SUMMARY

Multiple aspects of the present invention provide a method, an apparatus, and a system for phase jump detection, to improve the detection efficiency.

According to a first aspect, the present invention provides a phase jump detection method for detecting a phase jump in a microwave modem, including: collecting N frequency control words, where any one frequency control word is proportional to a frequency of an intermediate frequency signal currently received by the microwave modem, where N is a natural number, and N is greater than 1; and detecting, according to the N frequency control words, a phase jump in the intermediate frequency signal.

With reference to the first aspect, in a first possible implementation manner of the first aspect, the collecting N frequency control words includes: receiving the N frequency control words; and storing the N frequency control words in a queue.

With reference to the first aspect or the first possible implementation manner of the first aspect, in a second possible implementation manner of the first aspect, the detecting, according to the N frequency control words, a phase jump in the intermediate frequency signal includes: acquiring a difference value between a frequency control word with a largest numeric value and a frequency control word with a smallest numeric value among the N frequency control words; and generating, according to the difference value, a phase jump value of the intermediate frequency signal.

With reference to the second possible implementation manner of the first aspect, in a third possible implementation manner of the first aspect, the method further includes: receiving a forward error correction FEC signal; and acquiring the generated phase jump value of the intermediate frequency signal if the FEC signal indicates that an uncorrectable bit error occurs in the intermediate frequency signal.

With reference to the third possible implementation manner of the first aspect, in a fourth possible implementation, after the acquiring a difference value between a frequency control word with a largest numeric value and a frequency control word with a smallest numeric value among the N frequency control words, the method further includes: determining that the bit error is caused by the phase jump indicated by the phase jump value of the intermediate frequency signal.

According to a second aspect, the present invention provides a phase jump detection apparatus for detecting a phase jump in a microwave modem, including: a collecting unit, configured to collect N frequency control words, where any one frequency control word is proportional to a frequency of an intermediate frequency signal currently received by the microwave modem, where N is a natural number, and N is greater than 1; and a detecting unit, configured to detect, according to the N frequency control words, a phase jump in the intermediate frequency signal.

With reference to the second aspect, in a first possible implementation manner of the second aspect, the collecting unit is specifically configured to receive the N frequency control words, and store the N frequency control words in a queue; and the apparatus further includes a register, configured to store the queue of the N frequency control words.

With reference to the second aspect or the first possible implementation manner of the second aspect, in a second possible implementation manner of the second aspect, the detecting unit includes: a difference value calculating module, configured to acquire a difference value between a frequency control word with a largest numeric value and a frequency control word with a smallest numeric value among the N frequency control words; and a phase jump calculating module, configured to generate, according to the difference value, a phase jump value of the intermediate frequency signal.

With reference to the second possible implementation manner of the second aspect, in a third possible implementation manner of the second aspect, the detecting unit further includes: a receiving module, configured to receive a forward error correction FEC signal; and an acquiring module, configured to acquire the phase jump value of the intermediate frequency signal generated by the phase jump calculating module if an uncorrectable bit error occurs in the intermediate frequency signal indicated by the FEC signal.

With reference to the third possible implementation manner of the second aspect, in a fourth possible implementation manner of the second aspect, the acquiring module is further configured to determine that the bit error is caused by the phase jump indicated by the phase jump value of the intermediate frequency signal.

According to a third aspect, the present invention provides a phase jump detection system, including a microwave modem and the phase jump detection apparatus provided in any one of the implementation manners of the second aspect; the microwave modem includes: a receiver, configured to receive an intermediate frequency signal; and a phase-locked loop, configured to generate, according to the intermediate frequency signal, the N frequency control words.

With reference to the third aspect, in a first possible implementation manner of the third aspect, the microwave modem further includes: a forward error correction FEC device, configured to generate a FEC signal.

It can be learned from the foregoing technical solutions, in the embodiments of the present invention, by collecting N frequency control words, the phase jump in the intermediate frequency signal is detected according to the N frequency control words. An extra phase jump meter is not required, and therefore detection may be supported on massive microwave communications devices, thereby improving the detection efficiency.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Further, the term "and/or" in this specification describes only an association relationship for describing associated objects and represents that three relationships may exist. For example, A and/or B may represent the following three cases: Only A exists, both A and B exist, and only B exists. In addition, the character "/" in the specification generally indicates an "or" relationship between the associated objects.

Figure 1:
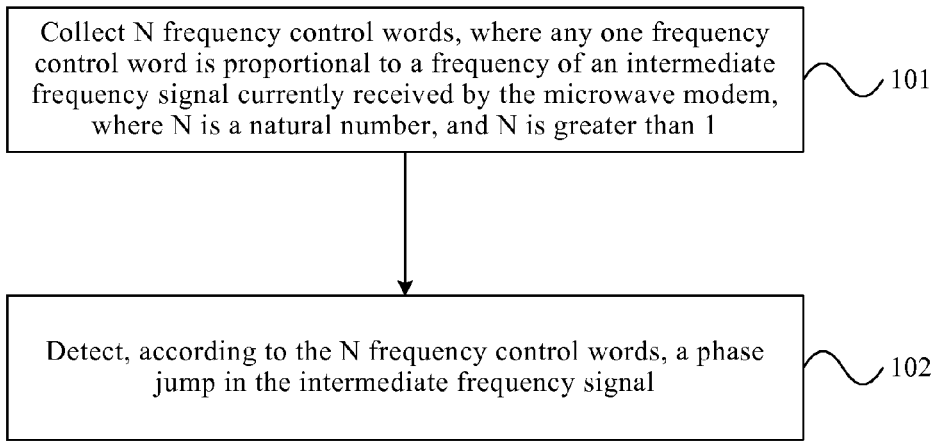
FIG. 1 is a schematic flowchart of a phase jump detection method according to an embodiment of the present invention.

FIG. 1 is a schematic flowchart of a phase jump detection method according to an embodiment of the present invention. The phase jump detection method provided in this embodiment is applicable to phase jump detection for a microwave modem.

101. Collect N frequency control words (Frequency Control Words, FCWs), where any one frequency control word is proportional to a frequency of an intermediate frequency signal currently received by the microwave modem, where N is a natural number, and N is greater than 1.

102. Detect, according to the N frequency control words, a phase jump in the intermediate frequency signal.

It should be noted that 101 and 102 may be executed by a phase jump detection apparatus.

Alternatively, in an alternative implementation manner of this embodiment, the microwave modem may specifically receive the intermediate frequency signal from a microwave communications device, that is, an ODU. For example, when the ODU is used as a receiver, after the ODU receives a first signal from another ODU, the ODU may specifically transmit the first signal to the microwave modem as the intermediate frequency signal. For another example, when the ODU is used as a transmitter, the ODU may specifically transmit a second signal that is to be transmitted, to the microwave modem as the intermediate frequency signal.

Alternatively, in an alternative implementation manner of this embodiment, in 101, the phase jump detection apparatus may specifically receive the N frequency control words. Then, the phase jump detection apparatus can store the N frequency control words in a queue.

For example, the phase jump detection apparatus may specifically adopt a first in first out (First In First Out, FIFO) storage manner to store the N frequency control words in a queue. Alternatively, for another example, the phase jump detection apparatus may specifically adopt another buffering method. For details, refer to the related description in the prior art, and details are not described herein again in this embodiment.

Alternatively, in an alternative implementation manner of this embodiment, in 102, the phase jump detection apparatus may specifically acquire a difference value between a frequency control word with a largest numeric value and a frequency control word with a smallest numeric value among the N frequency control words. Then, the phase jump detection apparatus may further generate, according to the difference value, a phase jump value of the intermediate frequency signal.

Further, the phase jump detection apparatus may further receive a forward error correction (Forward Error Correction, FEC) signal. If the FEC signal indicates that an uncorrectable bit error occurs in the intermediate frequency signal, the phase jump detection apparatus may acquire the generated phase jump value of the intermediate frequency signal.

Correspondingly, because the microwave modem is capable of suppressing continuous bit errors caused by phase noise, the phase jump detection apparatus may determine that the bit error is caused by the phase jump indicated by the phase jump value of the intermediate frequency signal, and therefore efficiency in locating the bit error can be effectively improved.

FEC is also referred to as channel coding, and is a technology used for controlling a transmission error in a unidirectional communications system, in which a bit error rate (Bit Error Rate, BER) is decreased by sending extra information with data to rectify an error. FEC is further classified into inband FEC and outband FEC.

Specifically, the microwave modem may include functional units such as a filter, a symbol synchronizer, an equalizer, a phase discriminator, a loop filter, a numerically controlled oscillator (Numerically Control Oscillator, NCO), and a forward error correction (Forward Error Correction, FEC) device. For details about each functional unit, refer to related content of the prior art, and details are not described herein again. An FCW value generated by the loop filter is proportional to the frequency of the intermediate frequency signal, that is, $fcw=f*2^{N+1}/fs$. fcw indicates the FCW value; f indicates the frequency of the intermediate frequency signal; N indicates a data bit width of the FCW value; and fs indicates a sampling frequency.

Figure 2:
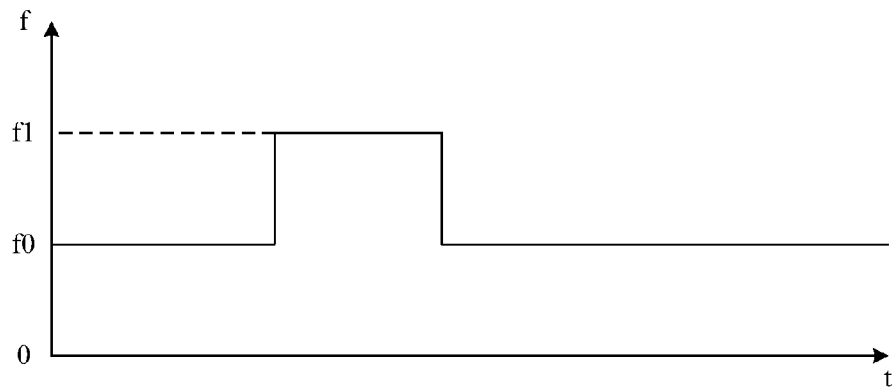
FIG. 2 is a schematic diagram of a phase jump in an intermediate frequency signal according to the embodiment corresponding to FIG. 1.

When an ODU generates a phase jump, a signal generated by the ODU, that is, the intermediate frequency signal, encounters an abrupt frequency change and then recovers. As shown in FIG. 2, the frequency of the intermediate frequency signal changes from f0 to f1, and then changes back to f0, that is, f0→f1→f0, and at this time, the phase jump in the intermediate frequency signal may be expressed as f_jump=f1−f0. First, the FCW value generated by the loop filter is collected according to the sampling frequency and is sent to a queue with a depth of M, where M is a positive integer. Each time when the queue is filled with M FCW values, the M FCW values in the queue may be processed to acquire a maximum value max and a minimum value min, and the maximum value may be used as f1 at this time and the minimum value may be used as f0 at this time.

Figure 3:
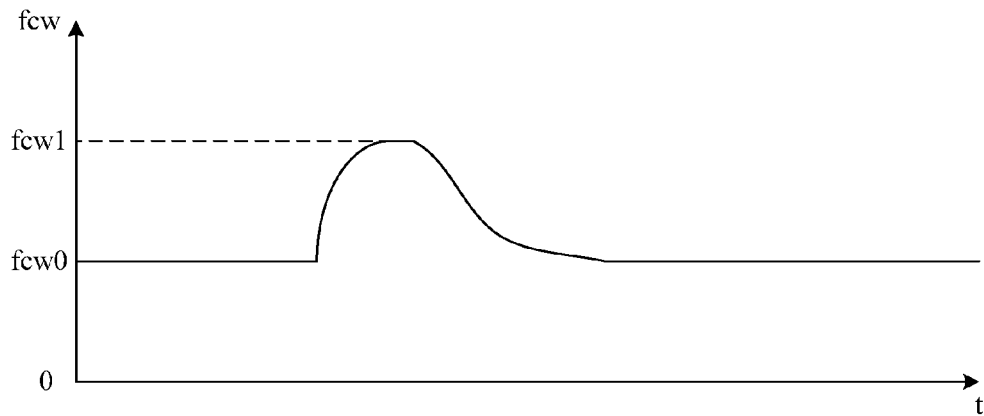
FIG. 3 is a schematic diagram of changes in an FCW value generated by a loop filter according to the embodiment corresponding to FIG. 1.

Correspondingly, the FCW value generated by the loop filter also encounters an abrupt change and then recovers. As shown in FIG. 3, the FCW value changes from f0 to fcw1, and then back to fcw0, that is, fcw0→fcw1→fcw0, and at this time, the FCW value may be expressed as fcw_jump=fcw1−fcw0. Therefore, the acquired phase jump in the intermediate frequency signal is $f\_jump=fcw\_jump*2^{N+1}/fs$.

In this embodiment, by collecting N frequency control words, the phase jump in the intermediate frequency signal is detected according to the N frequency control words. An extra phase jump meter is not required, and therefore detection may be supported on massive microwave communications devices, thereby improving the detection efficiency.

It should be noted that: for brevity, each of the foregoing method embodiments is described as a series of actions, but persons skilled in the art should be aware that the present invention is not limited by a sequence of the actions described, because according to the present invention, some steps may be performed according to another sequence or performed simultaneously. Secondly, persons skilled in the art should be aware that the embodiments described in the specification are preferred embodiments, and that the involved actions or modules are not necessarily required in the present invention.

In the embodiments, each embodiment has its emphasis. What is not described in details in one embodiment is described in details in the related description of another embodiment.

Figure 4:
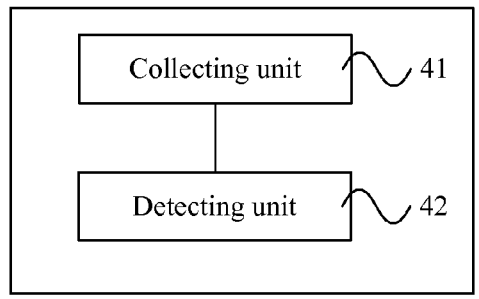
FIG. 4 is a schematic structural diagram of a phase jump detection apparatus according to another embodiment of the present invention.

FIG. 4 is a schematic structural diagram of a phase jump detection apparatus according to another embodiment of the present invention, as shown in FIG. 4. The phase jump detection apparatus provided in this embodiment is applicable to phase jump detection on a microwave modem. The phase jump detection apparatus according to this embodiment includes a collecting unit 41 and a detecting unit 42. The collecting unit 41 is configured to collect N frequency control words, where any one frequency control word is proportional to a frequency of an intermediate frequency signal currently received by the microwave modem, where N is a natural number, and N is greater than 1; and the detecting unit 42 is configured to detect, according to the N frequency control words, a phase jump in the intermediate frequency signal.

Alternatively, in an alternative implementation manner of this embodiment, the microwave modem may specifically receive the intermediate frequency signal from a microwave communications device, that is, an ODU. For example, when the ODU is used as a receiver, after the ODU receives a first signal from another ODU, the ODU may specifically transmit the first signal to the microwave modem as the intermediate frequency signal. For another example, when the ODU is used as a transmitter, the ODU may specifically transmit a second signal that is to be transmitted, to the microwave modem as the intermediate frequency signal.

Figure 5:
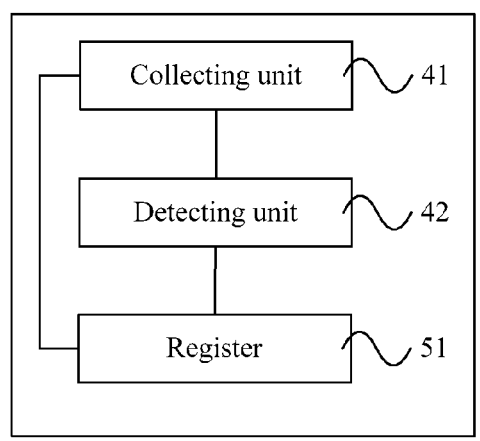
FIG. 5 is a schematic structural diagram of a phase jump detection apparatus according to another embodiment of the present invention.

Alternatively, in an alternative implementation manner of this embodiment, the collecting unit 41 is specifically configured to receive the N frequency control words, and store the N frequency control words in a queue; correspondingly, as shown in FIG. 5, the phase jump detection apparatus according to this embodiment further includes a register 51, configured to store the queue of the N frequency control words.

For example, the register 51 may specifically adopt a first in first out (First In First Out, FIFO) storage manner to store the N frequency control words in a queue. Alternatively, for another example, the register 51 may specifically adopt another buffering method. For details, refer to the related description in the prior art, and details are not described herein again in this embodiment.

Figure 6A:
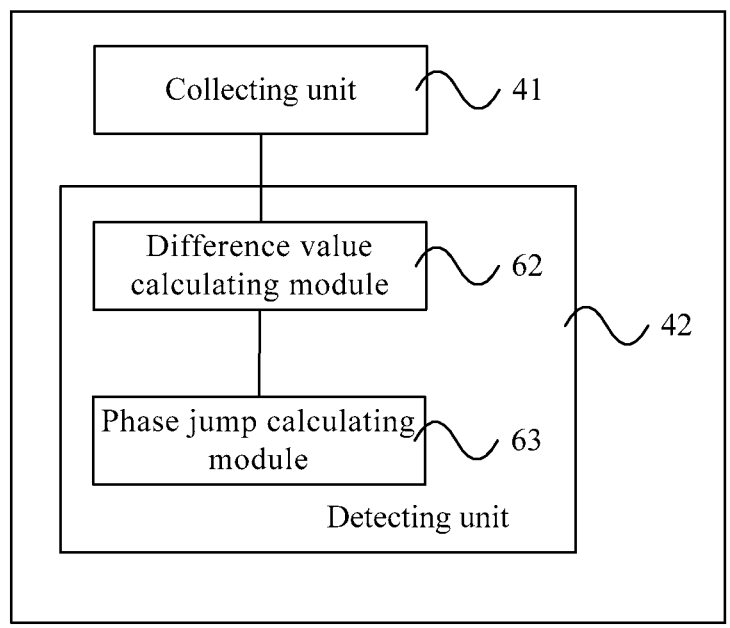
FIG. 6A is a schematic structural diagram of a phase jump detection apparatus according to another embodiment of the present invention.

Alternatively, in an alternative implementation manner of this embodiment, as shown in FIG. 6A, the detecting unit 42 according to this embodiment specifically includes:

a difference value calculating module 62, configured to acquire a difference value between a frequency control word with a largest numeric value and a frequency control word with a smallest numeric value among the N frequency control words; and a phase jump calculating module 63, configured to generate, according to the difference value, a phase jump value of the intermediate frequency signal.

Figure 6B:
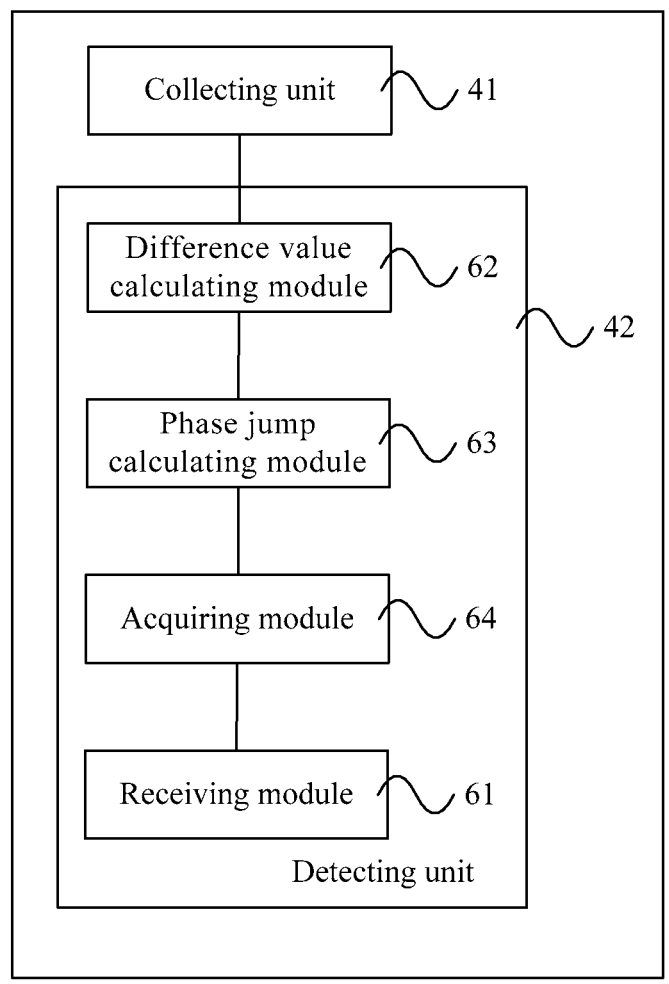
FIG. 6B is a schematic structural diagram of a phase jump detection apparatus according to another embodiment of the present invention.

Further, as shown in FIG. 6B, the detecting unit 42 further includes:

a receiving module 61, configured to receive a forward error correction FEC signal; and an acquiring module 64, configured to acquire the phase jump value of the intermediate frequency signal generated by the phase jump calculating module 63 if an uncorrectable bit error occurs in the intermediate frequency signal indicated by the FEC signal.

Correspondingly, the acquiring module 64 may be further configured to determine that the bit error is caused by the phase jump indicated by the phase jump value of the intermediate frequency signal, and therefore efficiency in locating the bit error can be effectively improved.

FEC is also referred to as channel coding, and is a technology used for controlling a transmission error in a unidirectional communication system, in which a bit error rate (Bit Error Rate, BER) is decreased by sending extra information with data to rectify an error. FEC is further classified into inband FEC and outband FEC.

Specifically, the microwave modem may include functional units such as a filter, a symbol synchronizer, an equalizer, a phase discriminator, a loop filter, a numerically controlled oscillator (Number Control Oscillator, NCO), and a forward error correction (Forward Error Correction, FEC) device. For details about each functional unit, refer to related content of the prior art, and details are not described herein again. An FCW value generated by the loop filter is proportional to the frequency of the intermediate frequency signal, that is, $fcw=f*2^{N+1}/fs$. fcw indicates the FCW value; f indicates the frequency of the intermediate frequency signal; N indicates a data bit width of the FCW value; and fs indicates a sampling frequency.

When an ODU generates a phase jump, a signal generated by the ODU, that is, the intermediate frequency signal, encounters an abrupt frequency change and then recovers. As shown in FIG. 2, the frequency of the intermediate frequency signal changes from f0 to f1, and then changes back to f0, that is, f0→f1→f0, and at this time, the phase jump in the intermediate frequency signal may be expressed as f_jump=f1−f0. First, the collecting unit 41 specifically collects, according to the sampling frequency, the FCW value generated by the loop filter and sends the FCW value to a queue with a depth of M in the register 51, where M is a positive integer. Each time when the queue is filled with M FCW values, the M FCW values in the queue may be processed to acquire a maximum value max and a minimum value min, and the maximum value may be used as f1 at this time and the minimum value may be used as f0 at this time.

Correspondingly, the FCW value generated by the loop filter further encounters an abrupt change and then recovers. As shown in FIG. 3, the FCW value changes from fcw0 to fcw1, and then back to fcw0, that is, fcw0→fcw1→fcw0, and at this time, the FCW value may be expressed as fcw_jump=fcw1−fcw0. Therefore, the acquired phase jump in the intermediate frequency signal is $f\_jump=fcw\_jump*2^{N+1}/fs$.

In this embodiment, by collecting N frequency control words, the detecting unit can detect, according to the N frequency control words, the phase jump in the intermediate frequency signal. An extra phase jump meter is not required, detection may be supported on massive microwave communications devices, thereby improving the detection efficiency.

Figure 7:
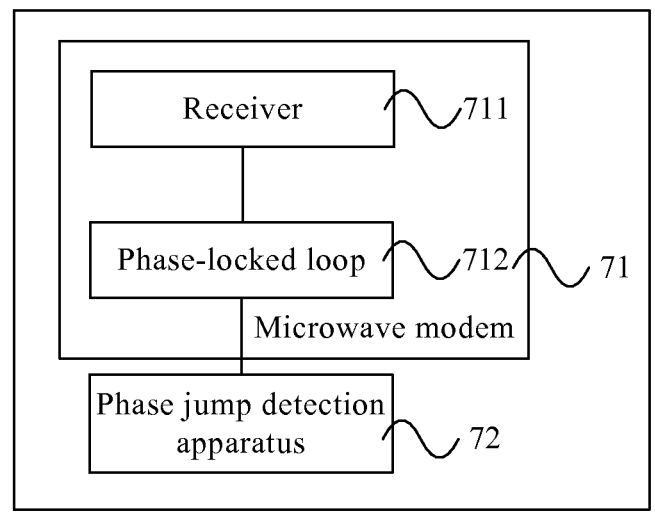
FIG. 7 is a schematic structural diagram of a phase jump detection system according to another embodiment of the present invention.

FIG. 7 is a schematic structural diagram of a phase jump detection system according to another embodiment of the present invention, as shown in FIG. 7. The phase jump detection system according to this embodiment may include a microwave modem 71, and a phase jump detection apparatus 72 provided in an embodiment corresponding to any one of FIG. 4 to FIG. 6. For details, refer to the corresponding content, and details are not described herein again.

The microwave modem 71 specifically includes:

a receiver 711, configured to receive an intermediate frequency signal; and a phase-locked loop 712, configured to generate, according to the intermediate frequency signal, the N frequency control words.

Figure 8:
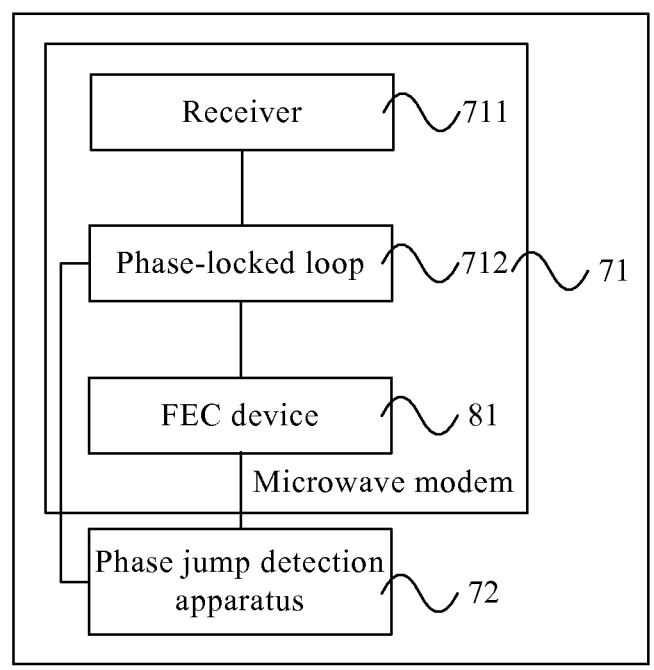
FIG. 8 is a schematic structural diagram of a phase jump detection system according to another embodiment of the present invention.

Alternatively, in an alternative implementation manner of this embodiment, as shown in FIG. 8, the microwave modem 71 further includes an FEC device 81, configured to generate the FEC signal.

In this embodiment, the phase jump detection apparatus collects N frequency control words, so that the phase jump detection apparatus can detect, according to the N frequency control words, the phase jump in the intermediate frequency signal. An extra phase jump meter is not required, and therefore detection may be supported on massive microwave communications devices, thereby improving the detection efficiency.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present invention, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented through hardware, or may be implemented in a form of hardware plus a software functional module.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A phase jump detection method for detecting a phase jump of a microwave modem, comprising:
    collecting N frequency control words, wherein any one frequency control word is proportional to a frequency of an intermediate frequency signal currently received by the microwave modem, wherein N is a natural number, and N is greater than 1; and
    detecting, according to the N frequency control words, a phase jump in the intermediate frequency signal.

2. The method according to claim 1, wherein the collecting N frequency control words comprises:
    receiving the N frequency control words; and
    storing the N frequency control words in a queue.

3. The method according to claim 1, wherein the detecting, according to the N frequency control words, a phase jump in the intermediate frequency signal comprises:
    acquiring a difference value between a frequency control word with a largest numeric value and a frequency control word with a smallest numeric value among the N frequency control words; and generating, according to the difference value, a phase jump value of the intermediate frequency signal.

4. The method according to claim 3, further comprising:
receiving a forward error correction FEC signal; and
acquiring the generated phase jump value of the intermediate frequency signal if the FEC signal indicates that an uncorrectable bit error occurs in the intermediate frequency signal.

5. The method according to claim 4, wherein after the acquiring a difference value between a frequency control word with a largest numeric value and a frequency control word with a smallest numeric value among the N frequency control words, further comprising:
determining that the bit error is caused by the phase jump indicated by the phase jump value of the intermediate frequency signal.

6. A phase jump detection apparatus for detecting a phase jump of a microwave modem, comprising:
a collecting unit, configured to collect N frequency control words, wherein any one frequency control word is proportional to a frequency of an intermediate frequency signal currently received by the microwave modem, wherein N is a natural number, and N is greater than 1; and
a detecting unit, configured to detect, according to the N frequency control words, a phase jump in the intermediate frequency signal.

7. The apparatus according to claim 6, wherein:
the collecting unit is specifically configured to:
receive the N frequency control words, and store the N frequency control words in a queue; and
the apparatus further comprises a register, configured to:
store the queue of the N frequency control words.

8. The apparatus according to claim 6, wherein the detecting unit comprises:
a difference value calculator, configured to acquire a difference value between a frequency control word with a largest numeric value and a frequency control word with a smallest numeric value among the N frequency control words; and
a phase jump calculator, configured to generate, according to the difference value, a phase jump value of the intermediate frequency signal.

9. The apparatus according to claim 8, wherein the detecting unit further comprises:
a receiver, configured to receive a forward error correction FEC signal; and
an acquirer, configured to acquire the phase jump value of the intermediate frequency signal generated by the phase jump calculator if an uncorrectable bit error occurs in the intermediate frequency signal indicated by the FEC signal.

10. The apparatus according to claim 9, wherein the acquirer is further configured to:
determine that the bit error is caused by the phase jump indicated by the phase jump value of the intermediate frequency signal.

11. A phase jump detection system, comprising a microwave modem and a phase jump detection apparatus, wherein the microwave modem comprises:
a receiver, configured to receive an intermediate frequency signal; and
a phase-locked loop, configured to generate, according to the intermediate frequency signal, N frequency control words;
the phase jump detection apparatus comprising:
a collecting unit, configured to collect the N frequency control words, wherein any one frequency control word is proportional to a frequency of an intermediate frequency signal currently received by the microwave modem, wherein N is a natural number, and N is greater than 1; and
a detecting unit, configured to detect, according to the N frequency control words, a phase jump in the intermediate frequency signal.

12. The system according to claim 11, wherein:
the collecting unit is specifically configured to:
receive the N frequency control words, and store the N frequency control words in a queue; and
the apparatus further comprises a register, configured to:
store the queue of the N frequency control words.

13. The system according to claim 11, wherein the detecting unit comprises:
a difference value calculator, configured to acquire a difference value between a frequency control word with a largest numeric value and a frequency control word with a smallest numeric value among the N frequency control words; and
a phase jump calculator, configured to generate, according to the difference value, a phase jump value of the intermediate frequency signal.

14. The system according to claim 13, wherein the detecting unit further comprises:
a receiver, configured to receive a forward error correction FEC signal; and
an acquirer, configured to acquire the phase jump value of the intermediate frequency signal generated by the phase jump calculator if an uncorrectable bit error occurs in the intermediate frequency signal indicated by the FEC signal.

15. The system according to claim 14, wherein the acquirer is further configured to determine that the bit error is caused by the phase jump indicated by the phase jump value of the intermediate frequency signal.

16. The system according to claim 14, wherein the microwave modem further comprises:
a forward error corrector, configured to generate a forward error corrector (FEC) signal.

* * * * *